Aug. 24, 1965    M. E. GROTZ    3,202,455
RETRACTABLE PICKUP TRUCK BED COVER
Filed June 24, 1963    3 Sheets-Sheet 3
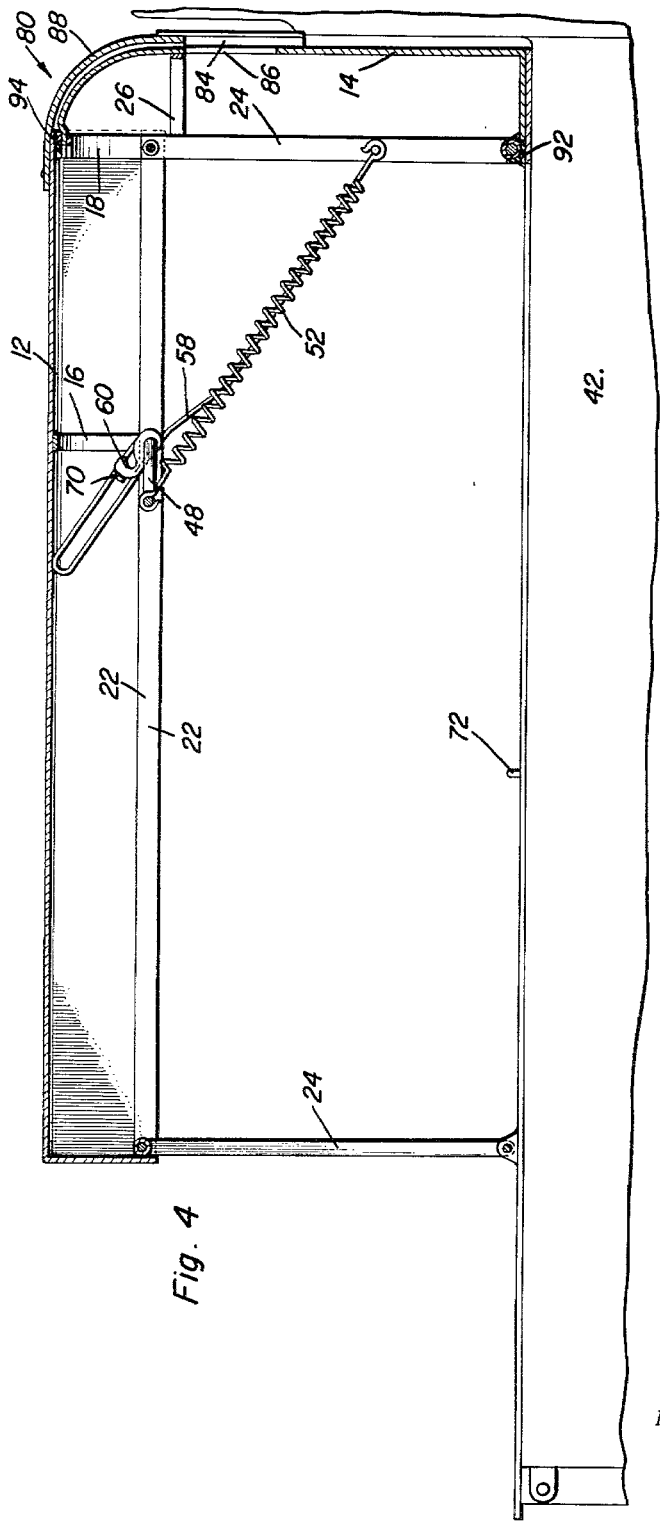
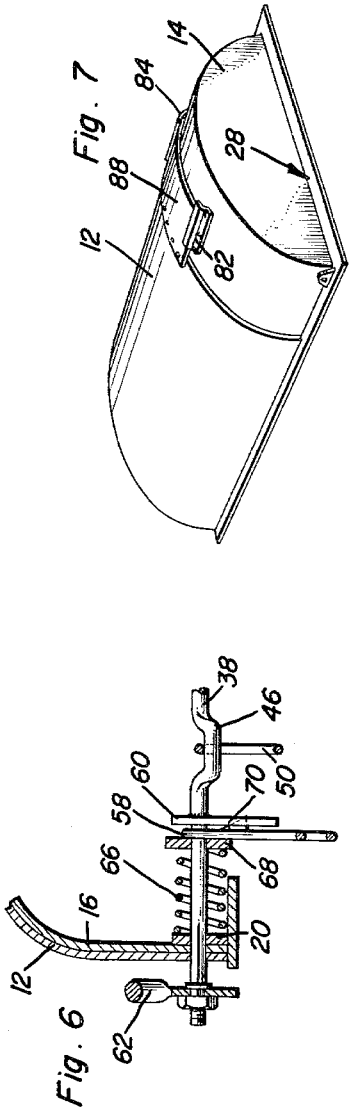
Mike E. Grotz
INVENTOR.

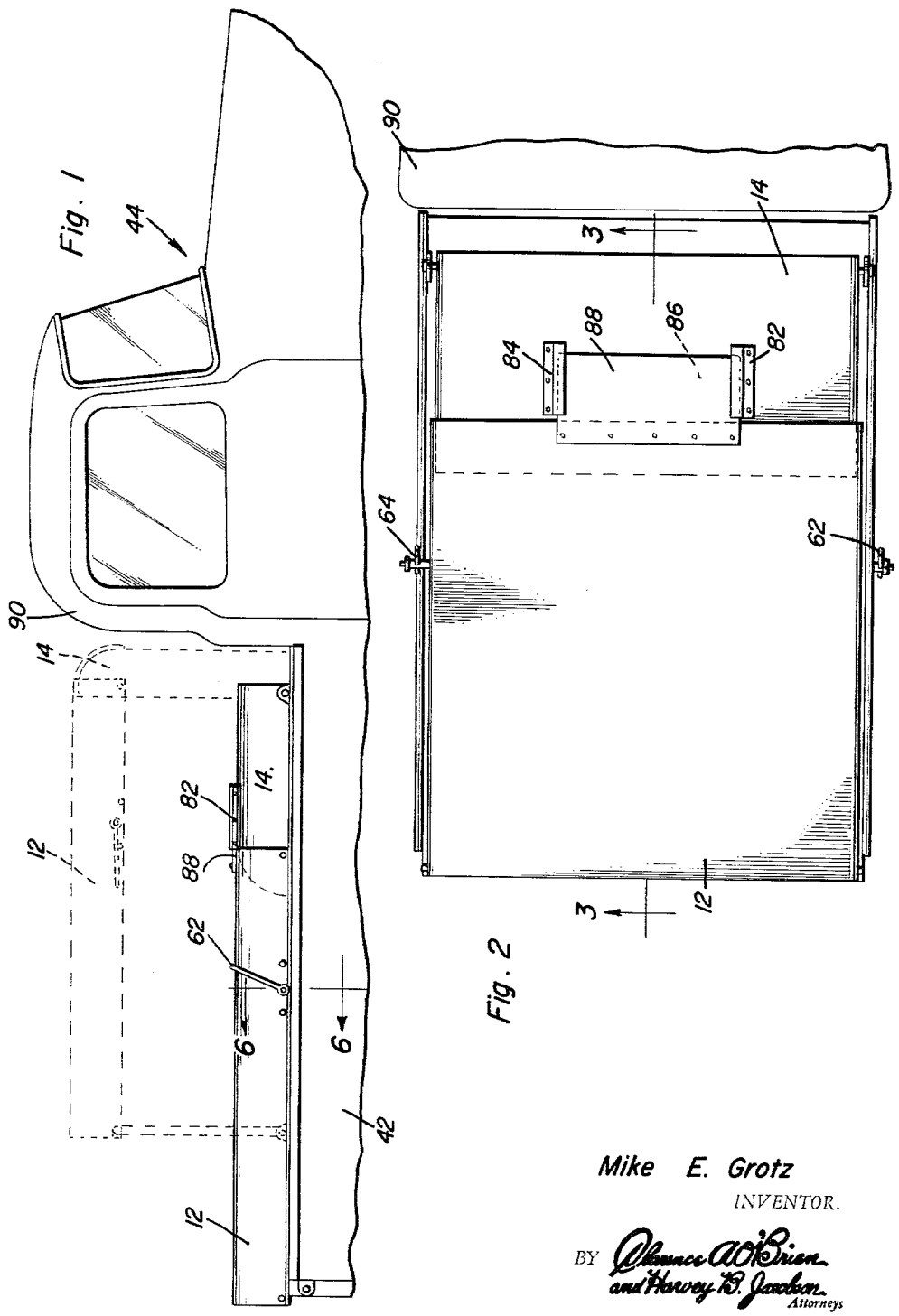

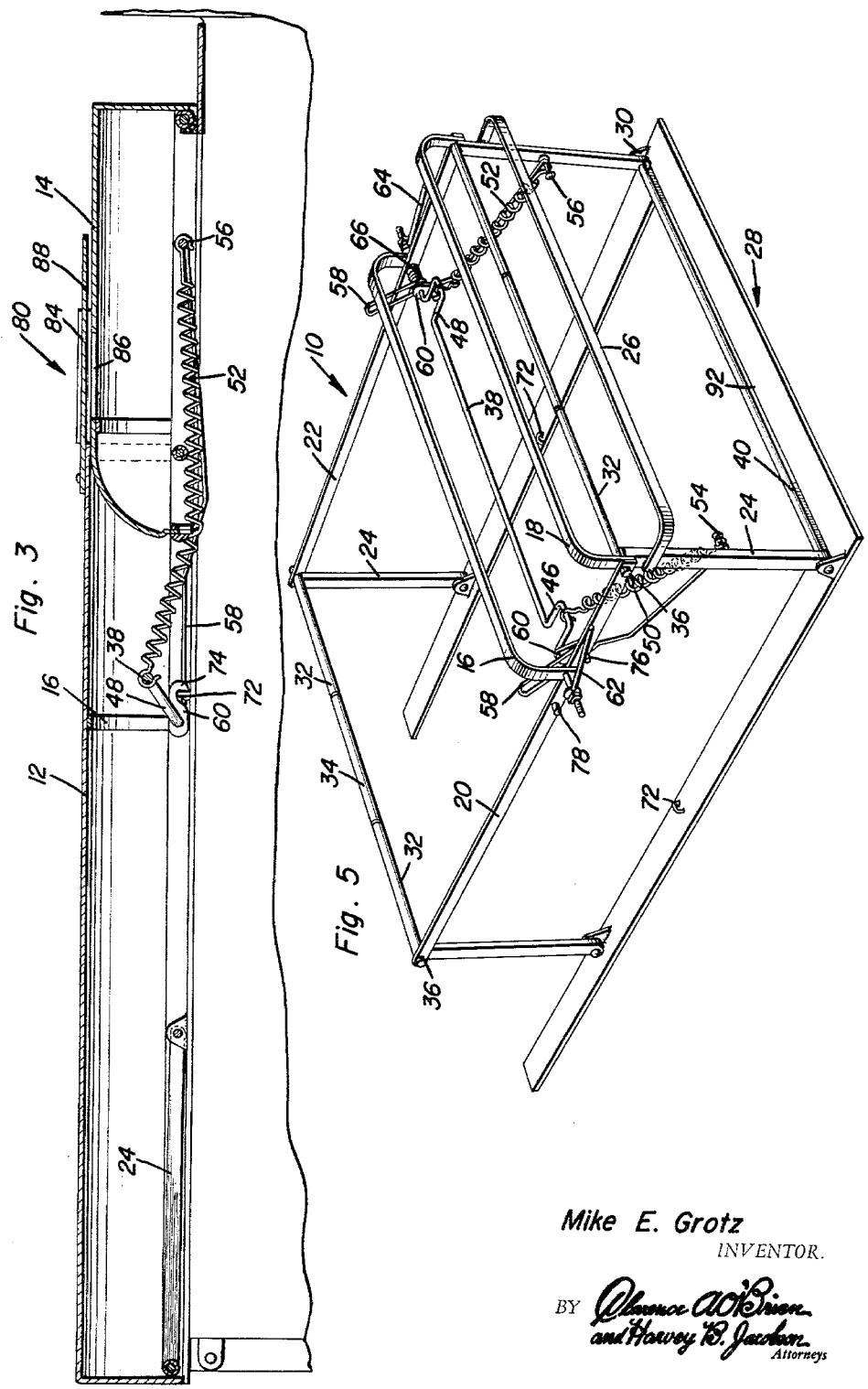

United States Patent Office 3,202,455
Patented Aug. 24, 1965

3,202,455
RETRACTABLE PICKUP TRUCK BED COVER
Mike E. Grotz, 48 Swan St., Sheridan, Wyo.
Filed June 24, 1963, Ser. No. 289,979
7 Claims. (Cl. 296—100)

This invention primarily relates to a pickup truck bed cover which may be raised and lowered over the truck bed to provide cover for articles being transported.

It is the primary object of this invention to provide a truck bed cover which is adapted to be used in either a low or high position with respect to the truck bed. In its low position, the cover cannot only be used for covering small articles, but the driver in the cab of the truck is provided with unobstructed rear vision at all times and wind resistance to the movement of the truck is substantially lessened. In its high position, the cover is adapted to not only house and shelter large articles being transported, but the bed cover is also provided with window means for allowing the driver to maintain the unobstructed rear vision he had when the truck bed cover was in its low position.

A further object of this invention resides in the provision of novel manual operating means for raising and lowering the cover element on the vehicle bed.

Yet another object of this invention resides in the novel means for locking the cover in both its high or low positions.

Another object of this invention is to provide a device of the character indicated which is of simple construction so as to facilitate its operation and to provide a device which is economically feasible, long lasting and efficient in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial side view in elevation of a pickup truck with the cover comprising the subject matter of the instant invention shown in low position in solid lines and in high position in phantom lines.

FIGURE 2 is a top plan view of the structure shown in FIGURE 1.

FIGURE 3 is a fragmentary sectional view taken substantially along the plane indicated by the line 3—3 of FIGURE 2 and illustrates the truck bed cover locked in its low position.

FIGURE 4 is a view similar to FIGURE 3 but illustrating the truck bed cover locked in its high position.

FIGURE 5 is a perspective view of the frame of the truck bed cover illustrating the mechanism which is used in raising and lowering the truck bed cover from its high to its low position and in more particular shows the mechanism in position just prior to locking the truck bed cover in its high position.

FIGURE 6 is a fragmentary sectional view taken substantially along the plane indicated by the line 6—6 of FIGURE 1.

FIGURE 7 is a perspective view of an alternative form of truck bed cover using the concepts embodied in the present invention.

Referring to the drawings in detail, the truck bed cover is adapted to be mounted upon a specially constructed frame generally designated by the numeral 10. The cover element itself, which may be made of metal, Fiberglas, plastic, canvas or any other weatherproof material, is formed from two mating sections 12 and 14 pivotally mounted upon the frame 10. The rigid cover portion 12 is positioned over a pair of U-shaped braces 16 and 18 which connect a pair of parallel crank four-bar linkage systems by being attached to the opposite movable connecting rods 20 and 22 of each system. These rods are in turn pivotally connected to the parallel crank arms 24 of each linkage system. The front crank arms 24 also carry a U-shaped brace 26 over which the cover portion 14 is disposed. Each of the crank arms 24 is pivoted on a three-sided hollow base 28, the legs of which constitute the stationary connecting rods of the four-bar linkage systems, by suitable lugs such as 30. Secured to the top of each one of the crank arms 24 is a tubular member such as 32. The tubular members 32 on each one of a pair of crank arms 24 are connected by means of a tube 34 welded to each one of the facing tubes 32. Each series of tubes 32, 34, 32 between opposite crank arms 24 carry hinge pins 36 which hingedly connect the movable connecting rods 20 and 22 to the crank arms 24. A spring exciter shaft 38 is also carried between the connecting rods 20 and 22, for a purpose which will be set forth below. The cover portion 12 is mounted over the U-shaped braces 16 and 18 and on the hinge pins 36 and the spring exciter shaft 38 on the outer side of the connecting rods 20 and 22. Similarly, the cover portion 14 is mounted between the hinge rod 40, which extends between the lower portions of the front crank arms 24, and the hinge pin 36 pivotally connecting the connecting rods 20, 22 to the crank arms 24, on the inside of the connecting rods so as to be snugly received within the cover portion 12 adjacent the front thereof. The U-shaped brace 26 snugly fits within the cover portion 14.

The frame 10 may be positioned upon the upstanding side walls 42 of a pickup truck 44. This is accomplished by securing the base 28 by any suitable means upon the horizontal shoulders of the side walls.

As previously mentioned, the cover portions 12 and 14 are adapted to assume a high and a low position. To carry out this operation simply and efficiently, the spring exciter shaft 38 is formed with a pair of eccentric portions 46 and 48. A pair of springs 50 and 52 are carried by the bight portions of the eccentrics 46 and 48 and are atached to the front crank arms 24 by means of pins 54 and 56. The springs 50 and 52 are in an unstressed condition when the spring exciter shaft 38 is in the position shown in FIGURE 5. Also carried by the shaft 38 and positioned between the eccentrics 46, 48 and the connecting rods 20 and 22, are stop and lock rods 58 and eccentric cams 60. The eccentric cams 60 are rigidly attached to the shaft 38 while the stop and lock rods 58 are pivotally carried by the pins 54 and 56 at one end and include loops at their other ends which are slidably and pivotally mounted on the shaft 38. A pair of operating levers 62 and 64 are carried on opposite ends of the shaft 38 and locked thereto. To complete the assembly, pressure springs 66 are disposed between washers such as 68 and both of the rods 20, 22. The springs 66 push the washers 68 up against the stop and lock rods 58 to keep them in position as will subsequently become apparent. Each one of the stop and lock rods 58 have mounted thereon a latch 70 which faces the adjacent eccentric cam 60.

The operation of moving the cover portion from its low position to its high position is as follows herein: Referring to FIGURE 3, it will be seen that in its low position, each one of the eccentric cams 60 is attached to an eye member 72 carried by the base 28. This is due to the eccentric cams 60 having a hook such as 74 at one end thereof which is adapted to mate with each of the eyes 72. In its low position, the top edge of the cover portion 14 contacts the springs 50, 52 adjacent the midsections thereof to break the straight length of the springs and place them in over-center position to more effectively urge the hooks 74 on the eccentric cams 60 into engagement with eyes 72. To release this lock, the lever 62 or 64 is rotated in counterclockwise fashion as viewed in FIGURE 3, to release the hooks 74 from the eyes 72 and at the same time to impart a slightly upward force to the edge of the cover 14. With the edge of the cover 14 slightly pushed upwardly, the springs 52 and 50 straighten out and will tend to shorten their distance between the eccentrics and the pins 54, 56. When the spring has reached this straight line position, the operator can release either of the levers 62, 64, whereby the force of the springs will move the eccentrics and the exciter shaft 38 to the position shown in FIGURE 5, also raising the frame 10 to its high position. The movement of the frame 10 to its high position is stopped when the springs 50, 52 reach an unstressed position as that shown in FIGURE 5. During this movement, the levers 62, 64 rotate in a clockwise direction as seen in FIGURES 3 and 5 until they abut stops such as 76 extending laterally from each of the rods 20, 22. Of course, it should be understood that by shortening the distance between the eccentrics 46, 48 and the pins 54, 56, the crank arms 24 are rotated to an upstanding position and the rods 20, 22 assume a position above the base 28 as substantially shown in FIGURES 4 and 5.

When the cover elements 12 and 14 and the frame 10 have reached their high position, the stop and lock rods 58 have also been slid to the position shown in FIGURES 4 and 5 wherein the stop and lock rods 58 abut the horizontal cover portion 12. To lock the cover elements in the high position, it is only necessary to rotate either lever 62 or 64 in a counterclockwise direction as viewed in FIGURES 3, 4 and 5 to abut either one of a pair of stops 78 also extending laterally from the connecting rods 20, 22. This will displace the eccentrics 46, 48 approximately 180° from their position as shown in FIGURE 5 to the position as shown in FIGURE 4. This carries the springs 50, 52 over-center and causes each one of the eccentric cams 60 to abut the latch 70 on each of the stop and lock rods 58. As shown in FIGURE 4, due to the over-center position of the springs 50, 52 the springs 50, 52 will tend to pull the eccentrics 46, 48 in a counterclockwise direction. However, because of the cam surfaces on the cams 60 contacting the latches 70, this is impossible, and the cover portions are rigidly locked in their high position. The springs 66 effectively keep the latch 70 engaged with the cam surface of the eccentric cams 60.

To lower the cover, the above-described procedure is reversed. That is, either one of the levers 62, 64 is first rotated in a clockwise direction as viewed in FIGURE 4 to break the lock of the eccentric cam with the latch 70 on each of the stop and lock rods 58. A downward force is then applied to the horizontal cover element 12 against the force of the springs 50, 52 to lower the whole cover. The hook 74 on each of the eccentric cams 60 is then positioned within the eye members 72 on the base 28.

As will be seen from FIGURE 1, when the cover is in its low position, the vehicle operator has a clear rear view. To maintain this view when the cover is in its high position, a window assembly generally designated by the numeral 80 is formed between the cover elements 12, 14. This assembly comprises a pair of oppositely facing L-shaping guide members 82 and 84 rigidly attached to the cover portion 14. A rectangular opening 86 is also formed in the cover element 14 between the L-shaped members. A flexible flap 88 is secured to the cover element 12 at the front end thereof. The flexible flap 88 is adapted to be guided by the raised flanges on the L-shaped members 82, 84 during relative movement of the cover elements 12 and 14. As shown in FIGURE 4, when the cover is in its high position, the operator of the vehicle has an unobstructed view through the rectangular opening 86. However, when the cover is in its lower position, the flexible flap 88 covers the opening 86 thereby preventing any direct contact of the contents carried by the pickup truck with the elements. In its high position, the body of the cab 90 of the pickup truck is adjacent the front of the cover portion 14 thereby substantially precluding rain or the like from entering within the cover.

To further prevent any leakage about the joints of the cover, a seal 92 is placed beneath the pivot rod 40. Also, a rubber seal 94 depends from the front lip of the horizontal cover portion 12 and seats upon the top of the vertical cover portion 14, thereby effectively sealing the joints preventing leakage through the cover.

FIGURE 7 illustrates a slightly modified form of cover, in that in lieu of the cover being formed rectangular in shape, the cover can be semi-oval shaped if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle bed, a cover movable between an upper and lower position with respect to the bed comprising vertically adjustable frame means movable between said upper and lower positions mounted on said vehicle and overlying said bed, relatively pivotable cover elements mounted on said frame means, said cover elements being axially aligned in said lower position and normal to each other in said upper position, window means formed in one of said cover elements for affording an unobstructed view through said one cover element when it has assumed its upper position, and flexible closure means carried by the other of said cover elements and automatically shiftable relative to said one element to a position covering said window means when said cover is in its lower position.

2. In combination with a vehicle bed, a cover movable between an upper and lower position with respect to the bed comprising vertically and horizontally adjustable frame means movable between said upper and lower positions mounted on said vehicle and overlying said bed, relatively pivotable cover elements mounted on said frame means, said cover elements being horizontally aligned in said lower position and normal to each other in said upper position, means carried by said frame means for locking said frame means in said upper and lower positions, and force applying means for vertically and horizontally moving said frame means to said upper position, said frame means defining a pair of parallelogram linkage systems connected by a plurality of bracing elements, said force applying means including a shaft journaled between said linkage systems, said shaft having at least one eccentric portion, spring means secured to said eccentric and to one of said linkage systems normally biasing said linkage systems and frame means to its upper position.

3. The combination of claim 2 wherein said locking means includes cam means rigidly fixed to said shaft, said cam means including a hook engageable with a keeper element carried by the one of said linkage systems when said frame means is in its lower position, a stop and lock rod pivotally secured to one of said linkage systems at one end and slidably and pivotally carried by said shaft at its other end, and latch means carried by said stop and lock rod engageable by said cam means when said frame means is in its upper position upon rotation of said shaft to a position placing said spring means under tension for preventing movement of said rod, thereby effectively locking said linkage systems and frame means against movement, said spring means biasing said cam means into engagement with said latch means.

4. The combination including a vehicle having an open top load bed, a convertible cover for said load bed including first and second horizontal and upstanding cover portions, means pivotally securing the upper and lower ends of said upstanding portion to said load bed and one end portion of said horizontal portion, respectively, for rotation about parallel axes extending transversely of said load bed and said cover portions, elongated upstanding support means pivotally secured at its upper and lower ends to the other end portion of said horizontal portion and said load bed for rotation about axes generally paralleling the first-mentioned axes, the spacing between the first-mentioned axes and the second mentioned axes and between the corresponding axes of the first and second mentioned axes being substantially equal whereby said combination defines a parallelogram linkage system, said combination defining an elevated position and said second cover portion and said support means being swingable to generally horizontally disposed positions with said second portion generally horizontally aligned with said first portion and forming a continuation of the latter for closing at least a portion of said load bed with said first and second portions closely overlying said portion of said load bed, said vehicle including a cab portion disposed on the side of said upstanding portion remote from said upstanding support means, said cab portion including a first window opening horizontally aligned with and opening toward said upstanding portion, the latter including a second window opening horizontally aligned with said first window opening, said horizontal portion including cover flap means operatively connected to said upstanding portion and automatically shiftable from an out-of-the-way position disposed to one side of said second window opening when said combination is in said elevated position to an operative closed position overlying said second opening when said first and second portions are substantially horizontally aligned.

5. The combination of claim 4 wherein said upstanding portion includes a curved upper end portion smoothly curving toward the remote end of said horizontal portion, the center of curvature of said curved upper end portion coinciding with the axis of rotation of said upstanding portion relative to said horizontal portion, the free end of said curved upper end portion being disposed in overlapping relation with the adjacent end of said first portion.

6. The combination of claim 5 wherein said curved upper end portion is substantially semicylindrical.

7. The combination including a vehicle having an open top load bed, a convertible cover for said load bed including first and second horizontal and upstanding cover portions, means pivotally securing the upper and lower ends of said upstanding portion to said load bed and one end portion of said horizontal portion, respectively, for rotation about parallel axes extending transversely of said load bed and said cover portions, elongated upstanding support means pivotally secured at its upper and lower ends to the other end portion of said horizontal portion and said load bed for rotation about axes generally paralleling the the first-mentioned axes, the spacing between the first-mentioned axes and the second mentioned axes and between the corresponding axes of the first and second mentioned axes being substantially equal whereby said combination defines a parallelogram linkage system, said combination defining an elevated position and said second cover portion and said support means being swingable to generally horizontally disposed positions with said second portion generally horizontally aligned with said first portion and forming a continuation of the latter for closing at least a portion of said load bed with said first and second portions closely overlying said portion of said load bed, said vehicle including a cab portion disposed on the side of said upstanding portion remote from said upstanding support means, said cab portions including a first window opening horizontally aligned with and opening toward said upstanding portion, the latter including a second window opening horizontally aligned with said first window opening, said horizontal portion including cover flap means operatively connected to said upstanding portion and automatically shiftable from an out-of-the-way position disposed to one side of said second window opening when said combination is in said elevated position to an operative closed position overlying said second opening when said first and second portions are substantially horizontally aligned, said upstanding portion including a curved upper end portion smoothly curving toward the remote end of said horizontal portion, the center of curvature of said curved upper end portion coinciding with the axis of rotation of said upstanding portion relative to said horizontal portion, the free end of said curved upper and portion being disposed in overlapping relation with the adjacent end of said first portion, said curved upper end portion including means defining arcuate guide means extending thereabout and vertically aligned with said second window opening, said cover flap means comprising a flexible panel-like and stiff flap secured at one end to said first portion and having its other end slidingly engaged with said guide means, said flap, when said first and second portions are lowered to said aligned positions, being automatically extendable across said second window opening.

References Cited by the Examiner

UNITED STATES PATENTS

| | | | |
|---|---|---|---|
| 474,390 | 5/92 | Leech | 296—107 |
| 1,766,015 | 6/30 | Dupre | 296—99 |
| 2,531,140 | 11/50 | Linde | 296—100 |
| 3,051,964 | 9/62 | Fisher et al. | 4—172 |

A. HARRY LEVY, *Primary Examiner.*